United States Patent
Dawes et al.

(10) Patent No.: US 6,744,951 B2
(45) Date of Patent: Jun. 1, 2004

(54) WAVEGUIDES AND METHOD OF MAKING THEM

(75) Inventors: Steven B. Dawes, Corning, NY (US); Michael E. DeRosa, Painted Post, NY (US); Robert J. Hagerty, Corning, NY (US)

(73) Assignee: Cornigg Incorporated, Corning, NY (US)

( * ) Notice: Subject to any disclaimer, the term of this patent is extended or adjusted under 35 U.S.C. 154(b) by 160 days.

(21) Appl. No.: 09/850,341

(22) Filed: May 7, 2001

(65) Prior Publication Data

US 2002/0187432 A1 Dec. 12, 2002

(51) Int. Cl.[7] .................................................. G02B 6/26
(52) U.S. Cl. ............................ 385/50; 385/37; 385/129
(58) Field of Search ............................... 385/22, 37, 132, 385/14, 49, 50

(56) References Cited

U.S. PATENT DOCUMENTS

| | | | |
|---|---|---|---|
| 4,666,236 A | | 5/1987 | Mikami et al. |
| 5,107,535 A | | 4/1992 | Hakogi |
| 5,287,424 A | | 2/1994 | Sheem et al. |
| 5,483,612 A | | 1/1996 | Gallagher et al. ........... 385/127 |
| 5,515,464 A | | 5/1996 | Sheem |
| 6,137,939 A | * | 10/2000 | Henry et al. ................ 385/132 |
| 6,246,809 B1 | * | 6/2001 | Jouanno et al. ............... 385/22 |
| 6,304,687 B1 | * | 10/2001 | Inoue et al. .................... 385/14 |
| 6,466,707 B1 | * | 10/2002 | Dawes et al. .................. 385/14 |
| 6,519,380 B2 | * | 2/2003 | Dawes et al. .................. 385/14 |
| 2002/0122623 A1 | * | 9/2002 | Yoneda ........................ 385/37 |

FOREIGN PATENT DOCUMENTS

| | | | |
|---|---|---|---|
| EP | 0724171 A2 | 1/1996 | ............ G02B/6/16 |
| EP | 0859247 A2 | 2/1998 | ............ G02B/6/00 |
| WO | WO 97/33188 | 2/1997 | |

OTHER PUBLICATIONS

Sheem et al. "Low-Cost Integrated-Optic Fiber Couplers", SPIE vol. 3005.

Inoue et al. "Athermal silica-based arrayed-waveguide grating multiplexer" Electronic Letters, Nov. 6, 1997, vol. 33, No. 23.

Kaneko et al. "Athermal Silica-based Arrayed-waveguide Grating (AWG) Multiplexers with New Low Loss Groove Design", OFC-98 Technical Digest TU 01-1, p. 204–206.

Bachelot et al. "Integration of micrometer-sized polymer elements at the end of optical fibers by free-radical photo-polymerization", Applied Optics, vol. 40, No. 32, Nov. 10, 2001.

(List continued on next page.)

Primary Examiner—John D. Lee
Assistant Examiner—Eric Wong
(74) Attorney, Agent, or Firm—Svetlana Z. Short

(57) ABSTRACT

A method of coupling optical waveguides comprising the steps of: (i) providing at least one pair of waveguides located such that (a) light radiation propagating through one of the waveguides will be at least partially coupled to a corresponding waveguide and, (b) these waveguides are separated by a gap of about 2 $\mu$m to about 500 $\mu$m long; the waveguides having positive dn/dT; (ii) filling the gap with a photo-polymerizable composition, the composition having dn/dT of $-2 \times 10^{-4}$/C to $-4 \times 10^{-4}$/C; (iii) providing simultaneous photo-radiation through said waveguides, wherein the photo-radiation photo-polymerizes the composition, thereby (a) creating a first region bridging between the waveguides, the first region having a first index of refraction, and (b) a second region encapsulating the first region, the second region having a second index of refraction, such that said first index of refraction of the first region is at least 0.1% higher than the second index of refraction; and (iv) curing the remaining composition, while retaining an index difference of at least 0.1% between the first region and the second region.

5 Claims, 7 Drawing Sheets

OTHER PUBLICATIONS

Kagami et al. "Polymer optical waveguide devices for low-cost WDM module", Proc. SPIE vol. 4106 (2000).

Koichi et al. "Optical path adhesive composition and endfire cure", SciFinder, Feb. 16, 2000.

"Maximum effective area for non–zero dispersion–shifted fiber" Nouchi P. OFC '98 Technical Digest, p. 303–304.

"A new design for dispersion–shifted fiber with an effective core area larger than 100 $\mu m^2$ and good bending characteristics" Masao Kato et al, OFC '98 Technical Digest p. 301–302.

* cited by examiner

FIG. 3A  PREGELLED NOA81 ADHESIVE BETWEEN SMF28 FIBERS BEFORE ENDFIRE CURING.
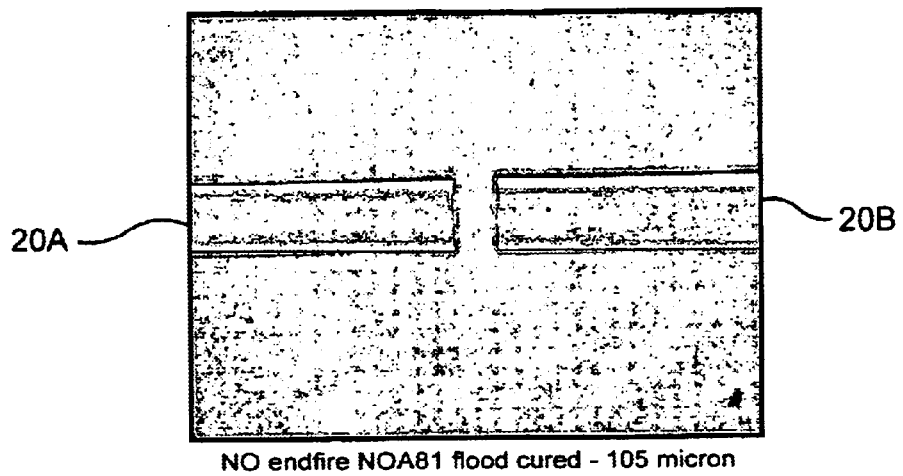
NO endfire NOA81 flood cured - 105 micron
FIG. 3B  WAVEGUIDE BETWEEN TWO FIBERS AFTER ENDFIRE CURING.
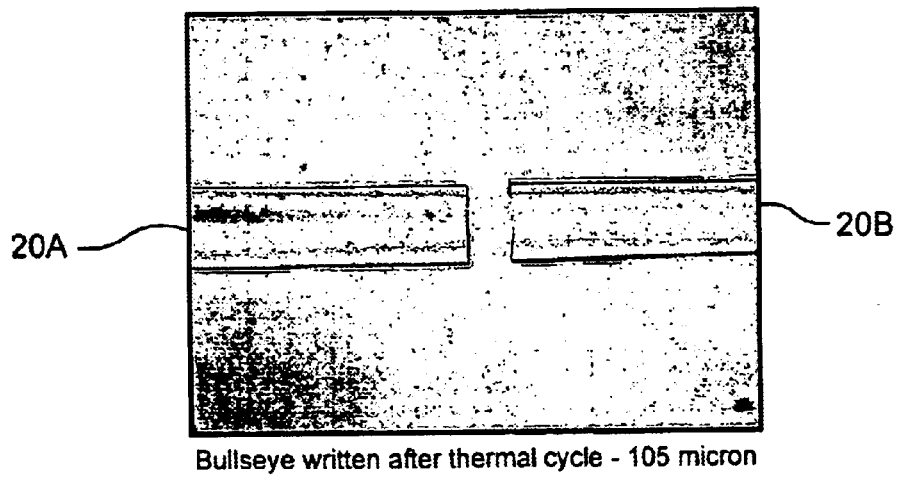
Bullseye written after thermal cycle - 105 micron

WAVEGUIDES AND METHOD OF MAKING THEM

CROSS-REFERENCE TO A RELATED APPLICATION

Reference is made to copending patent application, filed simultaneously herewith in the name of Dawes et al. and entitled "PHOTOSENSITIVE MATERIAL SUITABLE FOR MAKING WAVEGUIDES AND METHOD OF MAKING WAVEGUIDES UTILIZING THIS PHOTOSENSITIVE OPTICAL MATERIAL."

BACKGROUND OF THE INVENTION

1. Field of the Invention

This invention relates to optical waveguide devices and a method of manufacturing optical waveguide devices.

2. Technical Background

Wavelength division multiplexers (WDMs) are designed to separate broad wavelength bands comprised of many discrete narrow band optical signals (individual channels corresponding to different signal streams) into a number of predetermined narrow wavelength bands each corresponding to an individual signal channel, at designated output locations. An example of wavelength division multiplexer is a phase array device formed in silica based glass. When subjected to changes in operating temperature, the phase array device shifts the channels into incorrect output locations. The temperature dependent shifts of the channels are caused by index of refraction changes in optical glass, which result in variations in optical path length (OPL) in the phase array.

More specifically, the phase arrays rely on designed OPL differences to provide a grating effect and to separate, based on wavelength, single broadband input light into several narrow band channels. In such devices, the temperature dependence of the center channel's central wavelength's position arises from the OPL shifts or changes with temperature, which is due to non zero CTE (coefficient of thermal expansion) and the dn/dT (temperature induced refractive index change) of the glass. The central wavelength of the center channel may vary by as much as 0.01 nm/C.°. If the channel spacing were 0.5 nm, a 50-degree temperature shift would shift the center channel into an adjacent position. This could result in loss of channels and scrambling in subsequent channel routing. As a result, WDM specifications generally include a thermal stability requirement, allowing a center channel's central wavelength shift of less than 0.05 nm over a 70-degree temperature range. In order to overcome the channel shift problem, and to provide the required thermal stability one can utilize a phase array with an actively controlled temperature packaging. However, this approach is relatively expensive and results in large size packaging.

Passive athermalization for phase arrays requires some form of correction for the temperature dependent OPL shifts. It is known to etch a gap in the phase array of a planar WDM device, creating a separation between the wave guide pairs, and then to fill this gap with an optically transmissive material that has a negative dn/dT. This approach is described in the article entitled "Athermal silica based arrays waveguide grating multiplexer", Electronic Letters, volume 33, No. 23, pp. 1945–1946, 1997. The dimensions of the gap are such that the light propagating through each arm of the phase array is compensated by having to move through the negative dn/dT material, such that the overall thermally induced optical path length change is zero. However, this approach is also problematic. More specifically, the gap region (with the negative dn/dT material) is lossy due to diffraction through the gap. Loss reduction by using multiple gaps is possible, as disclosed in OFC-98 Technical Digest TU 01–1, pg. 204–206, but this has the disadvantage of back reflections and potentially high crosstalk. Loss reduction by formation of slab waveguides, comprised of different index layers in the polymer material situated in the gap is also known. However, such waveguides are difficult and costly to manufacture and compensate only for half of the diffraction induced losses.

Fiber to fiber splicing is a critical process step in the fabrication of many devices, and is especially difficult to do when the thermo-mechanical properties of the two fibers are significantly different from one another. Conventional fusion splicing techniques can not be employed for example, for coupling a highly doped amplifying fiber to a silica transmission fiber because during the splicing process the fiber with the lower melting temperature will melt first and fuse to the high melting temperature fiber (silica fiber). When the splice cools down, significant thermal stress builds up in the joint and ultimately causes a fracture. Furthermore, the fabrication of a generic fiber-to-fiber splice requires the two optical fibers to be actively aligned with the ends separated by a distance of about 2 μm to about 150 μm. Such fibers are difficult to couple efficiently because the signal light beam provided by the input fiber expands before reaching the second, output fiber, resulting in significant optical loss.

Thus there is a need for devices that provide efficient light coupling between pairs of optical waveguides, when the two waveguides constituting each pair are separated from one another.

End-fire curing is the process of sending UV light through the waveguide so that it exits the waveguide and photo-cures (photo-polymerizes) the region which contains photo-polymerizable material and which is located adjacent to the exit face of the waveguide. Such photo-polymerizable materials are one or more monomers with similar diffusion coefficients. These materials tend to further polymerize after the initial exposure, when subsequently exposed to thermal or photo radiation. These materials are susceptible to changes in their index of refraction with time. Thus, there is a need for better photo-curable adhesives.

SUMMARY OF THE INVENTION

According to one aspect of the present invention a method of coupling optical waveguides comprising the steps of: (i) providing at least one pair of waveguides located such that (a) light radiation propagating through one of the waveguides will be at least partially coupled to a corresponding waveguide and, (b) these waveguides are separated by a gap of about 2 μm to about 500 μm long; the waveguides having positive dn/dT; (ii) filling the gap with a photo-polymerizable composition, the composition having dn/dT of $-2\times10^{-4}$/C to $-4\times10^{-4}$/C; (iii) providing simultaneous photo-radiation through said waveguides, wherein the photo-radiation photo-polymerizes the composition, thereby (a) creating a first region bridging between the waveguides, the first region having a first index of refraction, and (b) a second region encapsulating the first region, the second region having a second index of refraction, such that said first index of refraction of the first region is at least 0.1% higher than the second index of refraction; and (iv) curing the remaining composition, while retaining an index difference of at least 0.1% between the first region and the second region. According to a preferred embodiment of the present invention said photo-radiation is in a 180 nm to 400 nm region.

According to an embodiment of the present invention, a waveguide device comprises at least one pair of waveguides located such that light radiation propagating through one of said waveguides will be at least partially coupled to a corresponding waveguide. These waveguides are separated by a gap of about 2 μm to about 500 μm and have positive dn/dT. The waveguide device further comprises another waveguide, connecting these pair of waveguides. This connecting waveguide has dn/dT of $-2 \times 10^{-4}$/C.° to $-4 \times 10^{-4}$/C.°.

According to an embodiment of the present invention a waveguide device, wherein said pair of waveguides are optical fibers.

For a more complete understanding of the invention, its objects and advantages refer to the following specification and to the accompanying drawings. Additional features and advantages of the invention are set forth in the detailed description, which follows.

It should be understood that both the foregoing general description and the following detailed description are merely exemplary of the invention, and are intended to provide an overview or framework for understanding the nature and character of the invention as it is claimed. The accompanying drawings are included to provide a further understanding of the invention, and are incorporated in and constitute a part of this specification. The drawings illustrate various features and embodiments of the invention, and together with the description serve to explain the principles and operation of the invention.

BRIEF DESCRIPTION OF THE DRAWINGS

FIG. 1A illustrates a substrate with two optical waveguides and a gap therebetween. FIG. 1B illustrates the gap of FIG. 1A filled with liquid photo-polymerizable material. FIG. 1C illustrates the step of providing UV light, from the external sides of the optical waveguide, to the gap. FIG. 1D illustrates the exposure of the top surface of the substrate of FIG. 1B with UV light. FIG. 1E illustrates the coupled waveguides after the post bake process.

FIG. 3A is an enlarged perspective view of two SMF-28™ fibers embedded in photo-polymerized monomer before end fire curing.

FIG. 3B is an enlarged perspective view of two SMF-28™ fibers embedded in the photo-polymerized polymer after end fire occurring.

DETAILED DESCRIPTION OF THE PREFERRED EMBODIMENTS

Figure 1A:
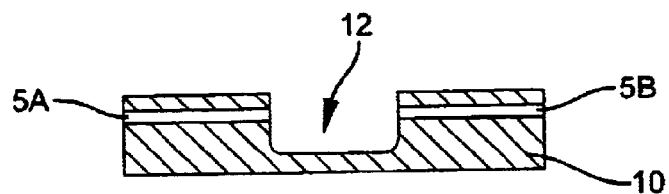
FIGS. 1A–1E illustrate schematically the general process for making low loss waveguide couplers. More specifically
Figure 1B:
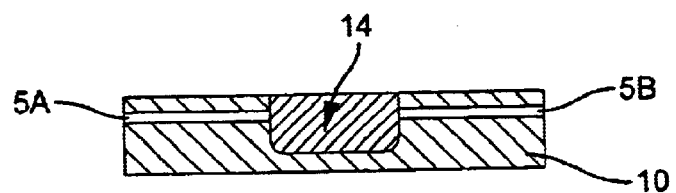
Figure 1C:
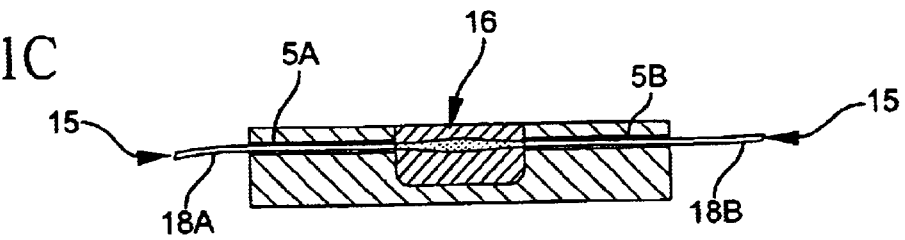

The general process for making the a coupling device 2 providing low loss coupling of waveguides is shown schematically in FIGS. 1A through 1E. More specifically, waveguides pair 5A, 5B are etched into a planar substrate 10. In order to minimize signal loss, the waveguides 5A and 5B are aligned so that their optical axis are preferably co-linear with one another. The substrate 10 is also etched to form a gap 12 therein. The gap 12 is filled with a liquid photo-polymerizable material 14 such as a composition curable by UV (ultraviolet) radiation. It is preferred that refractive index variations with temperature (dn/dT) of this polymerizable material is $-1 \times 10^{-4}$ to $-5 \times 10^{-4}$ and preferably $-2 \times 10^{-4}$ to $-4 \times 10^{-4}$. It is preferred that the material 14 has a low absorption coefficient of less than 0.5 dB, and more preferably, less than 0.3 dB/cm at λ=1550 nm. It is preferred that the absorption coefficient of the material 14 be in 0.2 dB/cm to 0.3 dB/cm range. Such material may be, for example, a halogenated polymer or combination of different halogenated polymers (including, for example, chlorinated, brominated or florinated polymers). The length D of the gap 12 between the two waveguides 5A and 5B is between about 5 μm and about 500 μm. In this embodiment, an ultra violet (UV) light 15 (for example, λ=365 nm) is coupled into the waveguide array, preferably simultaneously into two opposing sides of the substrate 10, to propagate through the waveguides 5A, 5B and through the UV light polymerizable material 14 inside the gap 12. It is preferred that the UV light intensity be about 300 mw/cm² or 2 mJ/cm² or higher, and that the UV light be coupled into the waveguides 5A, 5B for from about 5 minutes to about 3 hours. In this embodiment, the intensity of UV light beam exiting waveguides 5A and 5B is about 5 mJ/cm². The UV light exiting the waveguides 5A and 5B cures and polymerizes the liquid photo-polymerizable material 14 that is encountered in the light path of this UV light, forming an optical bridge 16 between the two sides of the etched gap. Thus, the bridge 16 becomes a waveguiding core in the gap region 12, such that the signal light entering the coupling device 2 can effectively couple from the waveguide 5A to opposing the waveguide 5B or vice-versa. The insertion loss (between waveguides 5A and 5B) depends on the lateral alignment of the opposing waveguiding cores and the absorption loss of the photo-polymerizable material 14 therebetween. The loss due to a small lateral misalignment of the two waveguides can be minimized by selecting a larger gap. That is, as the gap length D becomes larger, the sensitivity to insertion loss due to small lateral misalignment of two waveguides becomes smaller. Furthermore, in well-aligned waveguides, this insertion loss is not sensitive to the gap length D formation of the coupling waveguide, so long as the photo-polymerizable material 14 has a low absorption loss. Thus, the optical bridge 16 improves coupling between waveguides 5A and 5B and minimizes insertion losses.

In a subsequent step, the material 14 in the gap is flood-cured by the UV light. That is, the top surface of the etched gap 12 is exposed by the UV light (same wavelength, lower intensity), to further cure the optical bridge 16 and the remaining polymerizable material 14, so that optical bridge 16 is supported in the elastic medium. Thus, the optical bridge 16 becomes a core of the waveguide 17 connecting waveguides 5A, 5B and the area 16' surrounding it becomes its cladding. Finally, to thoroughly cure the polymerizable material 14 in the gap 12 and to provide long term stability, the coupling device 2 is baked at about 100 to 150° C.

For silicate based waveguides the dn/dT of the waveguides 5A, 5B are positive, with a magnitude of about $+1\times10^{-5}/°$ C., i.e., about a factor of 10 to 40 smaller than the absolute value of dn/dT of the bridge 16. Thus, the absolute value of the ratio of $dn/dT_{bridge}$ to $dn/dT_{waveguides}$ is about 10 to 40 and preferably about 30 to 40.

Figure 1D:
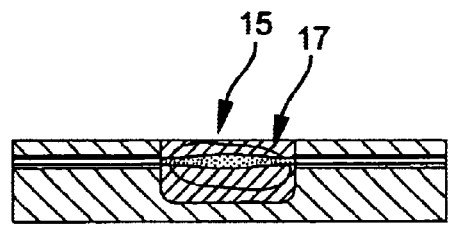
Figure 1E:
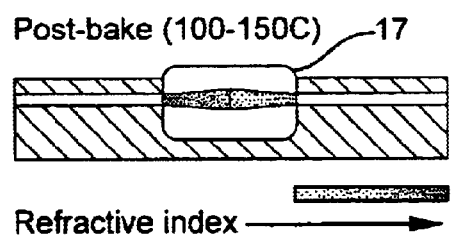

For applications such as athermalizing a planar WDM, the architecture of FIG. 1D may be advantageous. The optimal path length for the wavelength 5A and 5B is now n·L (where n is an index of waveguiding cores and L is their length). When temperature is changed, the change in OPL (called optical path difference or OPD) is $\Delta(nL) \approx \Delta n \cdot L$. It is desired that $\Delta(nL)$ be zero for the waveguide 5A, 5B and 16. Thus, $\Delta n \cdot L$ for the waveguide 16 is $-\Delta n \cdot L$ for waveguides 5A and 5B. Therefore, during the thermal shifts the OPL encountered by the signal light propagating through the waveguides 5A, 5B is compensated by the OPL induced by the core 16 of the waveguide 17, thereby athermalizing the device 2.

More specifically, it is preferred that two optical fibers 18A, 18B be coupled to the input and output waveguides 5A, 5B and the UV light is launched through both optical fibers 18A, 18B so that the photo-polymerizable material 14 is irradiated by UV from both sides simultaneously. As the UV light exits the waveguides 5A, 5B, the two UV beams overlap and the UV light initiates photo-polymerization. The amount of photo-polymerization is proportional to intensity of the UV light. In the photo-polymerized region 16 the index of refraction is higher than in the surrounding region 16'. More specifically, the core index of refraction (i.e., the index of the bridge 16) is higher by at least 0.1% and preferably by 0.3% to 1% than clad index of refraction (i.e., the index of the surrounding region 16'). The resultant waveguiding region 16 has a circular or oval cross-section and improves the optical coupling between the two silica waveguides 5A, 5B across the polymer filled gap.

A phase array is a coupling device with more than one pair of corresponding waveguides 5A, 5B present in the substrate 10. In a phase array, the UV beam is launched into the individual arms of the phase array through waveguides such as a star coupler. Preferably, the UV beam is launched into the photo-polymerizable material 14 from both sides of each arm in the waveguide simultaneously, and the guided UV light beams initiate photo-polymerization, forming a plurality of bridges 16. Thus, the final device has a plurality of waveguiding core regions corresponding to the bridges 16. The resultant waveguiding core regions 16 have circular or oval cross-sections and improve the optical coupling between the pairs of silica waveguides 5A, 5B across the gap. In a phase array the gap length D between the pairs of waveguides 5A and 5B is in the range of 20 $\mu$m to 500 $\mu$m is needed to athermalize the device. In several illustrative examples it was approximately 150 $\mu$m. During the thermal perturbations of the phase array, the thermally induced optical path differences encountered by signal light propagating through the plurality waveguides 5A, 5B are compensated by the optical path differences induced by the core waveguiding core regions 16 of the waveguides 17, thereby athermalizing the phase array.

As stated above, the index of refraction in the photopolymerized region corresponding to waveguide core regions 16 is higher than in the surrounding regions 16'. These waveguiding core regions 16 couple light from waveguides 5A into waveguides 5B. Without the presence of these waveguiding core regions 16 the signal light exiting a waveguide such as 5A, will spread, and only partially couple into the second, opposite waveguides 5B, resulting in high insertion loss. Thus, the improved end-fire coupling process results in formation of an optical waveguide in the polymer filled gap between the two silica waveguiding regions. The short waveguiding region 16 dramatically reduces the insertion loss and improves overall performance relative to the device operating with free space propagation through the gap.

As described above, a triangular or wedge shaped gap filled with the photo-polymerizable material 14 with the dn/dT value of $-1\times10^{-4}$ to $-5\times10^{-4}$ and, preferably, about $-2\times10^{-4}$ to $-4\times10^{-4}$ is utilized to provide these waveguiding core regions 16. In order to provide better athermalization, the gap between the waveguide pairs is wedge shaped, the length of the optical bridges 16 differ from one another.

Figure 1F:
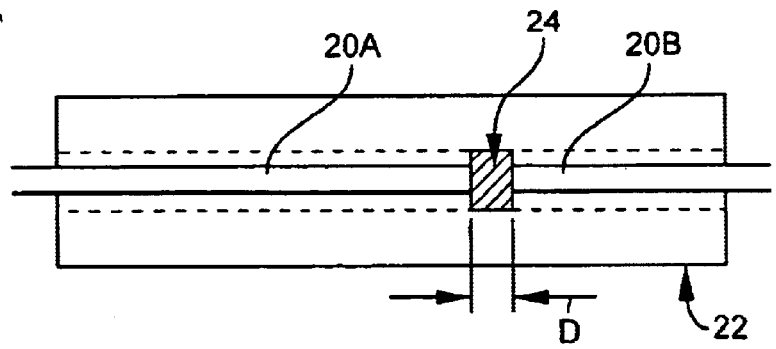
FIG. 1F illustrates two aligned optical fibers held by a fixture and seperated by a distance D.

The improved method of coupling waveguides may also be employed in the making fiber to fiber "splices" by forming a waveguiding core 16 between two aligned fibers. More specifically, the two fibers 20A and 20B are mounted to maintain their alignment relative to one another. In this embodiment (see FIG. 1F) the two fibers 20A and 20B are mounted and held by the alignment fixture 22 during the manufacturing process. The two fibers 20A, 20B are separated by an air gap that is at least 1 $\mu$m and, preferably, about 5 $\mu$m to about 200 $\mu$m long. Photo-curable polymerizable material 24 is then placed into the gap connecting the two facing ends of the fibers 20A and 20B, and the UV end-fire curing technique described above is used to photo-cure the material 24 in the region between these fibers. The photopolymerisable material 24 develops increased index on photoexposure due to densification, through crosslinking.

Thus, upon initial exposure to intense UV light the material 24 photo-polymerizes and cross links, forming a high index region 16, preferably by virtue of a permanent compositional change (i.e., molecular phase separation). That is, as described in the previous embodiments, during the cross linking process, the exposure to UV light increases the density of the exposed material and thus increases its index of refraction. Subsequently, UV light sets the rest of the material into a polymer within a lower index (clad) region 16'. As described above, the photo-polymerizable material 24 is chosen for attributes such as dn/dT, absorption loss, index contrast defining the waveguide and the core index of refraction to minimize reflection at the waveguide to waveguide interfaces. More specifically, it is preferred that this material has a reasonably low absorbtion loss (less than 3 dB/cm and preferably less than 2 dB/cm). The photo-polymerizable 24 has the ability to induce a significant index change about at least 0.05% and preferably, at least, 0.1% and, more preferably, between 0.3% and 1.0% on exposure to UV light with a resultant refractive index of about 1.455 at $\lambda$=1550 nm.

In some of the embodiments the photo-polymerizable material 24 was a commercially available optical adhesive material such as NOA (Norland Optical Adhesive) 81 or NOA 63, available from Norland Products, Inc. of Cranbury, N.J. These adhesive materials are not preferred because subsequent exposure to the UV light or to heat may further polymerize the cladding region 16'. This reduces the difference in refractive indexes between the core region 16 and clad region 16'. Thus a coupling device that uses one of these adhesive materials needs to be packaged to shield the polymerized regions 16 and 16' from the excessive thermal or photo exposure.

Applicants have developed a more preferable photopolymerizable composition, which undergoes a permanent compositional change during UV exposure. In this composition several components were mixed to form the photo-polymerazable liquid that, upon exposure to UV light, forms the core/clad waveguide structure 17. This composition includes (a) a slow curing component I (a polymer) with low diffusion coefficient (of about $10^{-8}$ cm$^2$/sec to about $10^{-10}$ cm$^2$/sec) and with low index of refraction, (b) a fast curing component II (a monomer) with high diffusion coefficient (of about of about $10^{-5}$ cm$^2$/sec to about $10^{-8}$ cm$^2$/sec) and high index of refraction, and (c) a component III (a di-functional monomer) that improves the compatibility of components I and II by binding to both compositions I and II to prevent phase separation and promote the stability of the cured polymer structure. The composition may also include two photo initiators. The first is a radical initiator and the second is a cationic initiator. These initiators, together with components I, II, and III can generate a large refractive index difference, upon completion of the curing process, between waveguiding core region 16 and the cladding 16'. More specifically, upon exposure to a localized beam of UV light (about 185 nm to about 500 nm) the component (II) polymerizes and densifies, forcing the low index component (I) away from the beam path. The resulting cured region has a high index of refraction, and can, thus, act as a core 16 in a waveguiding structure. In a second step the entire gap is dosed with a relatively low intensity flood illumination of UV radiation. In this step, both components (I) and (II) are polymerized into a relatively low index co-polymer (compared to the core), which serves as a cladding 16' in a waveguiding structure.

In this example, the first component (I) is a cationic polymerizable fluorinated solid polymer with a relatively low refractive index (1.43–1.47). It is preferred that this component (I) be a fluorinated aleimide/fluorinated acrylate/glycidyl methacrylate with a linear coefficient of thermal expansion of about 30–80 ppm/° C. It is more preferable that the linear coefficient of thermal expansion be about 30–60 ppm/° C.

Due to this component's highly fluorinated structure, it readily phase separates from the hydrocarbon monomers that comprise the rest of the formulation during photopolymerization. Thus, this component (I), due to its slow reactivity during the UV curing process at room temperature, flows away (by diffusion) from the cured high index region 16 and forms a part of the low index cladding 16'. Component (I) is described in more detail in a related U.S. patent application Ser. No. 09/704,116 filed on Nov. 1, 2000, which is incorporated by reference herein.

Component (II), is a high index and highly reactive hydrocarbon liquid monomer. This component is commercially available. An example of suitable component II is diacrylate or dimethacrylate. This component (II) will be polymerized in the path of the localized UV beam (i.e., the UV beam exiting through the waveguides 5A, 5B) because of the high UV reactivity and high diffusion coefficient compared with the composition (I).

The third component (III) is small amount of di-functional monomer that can bond directly to both component I and component II. This di-functional monomer can be polymerized by radical and cationic polymerization. One example of such monomer is glycidyl methacrylate. When reacted with components (I) and (II) initiated by a non-localized UV irradiation, such as during the flood exposure, it reduces the tendency for component I and component II to phase separate, resulting in an optically transparent, relatively low index co-polymer. The final structure of the entire composition is an interpenetrating polymer network (IPN). Specifically, the photo-polymerisable material providing a compositionally stable core/clad structure, was formulated as follows.

EXAMPLES

Figure 2A:
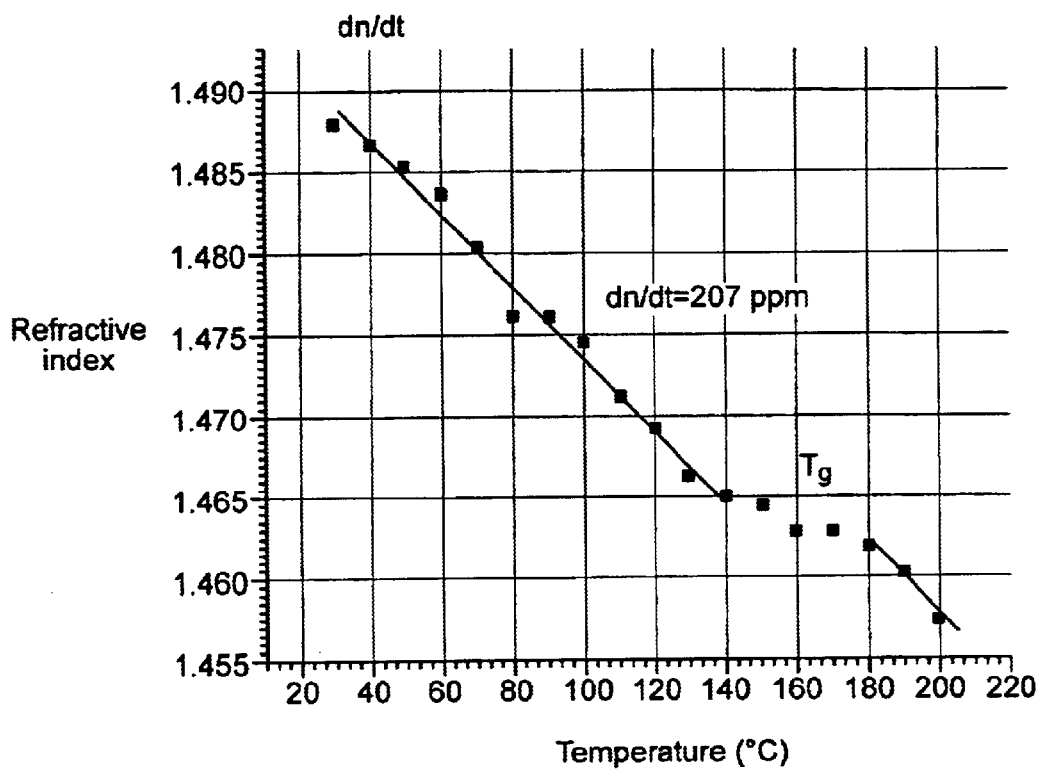
FIG. 2A a plot illustrating the dependence of refractive index on temperature.

In an experimental example, one gram of fluorinated maleimide/fluorinated acrylate/glycidyl methacrylate copolymer (composition (I), index≈1.462 at 1550 nm) was dissolved into 1.5 grams of composition (II) 1–4 butanediol dimethacrylate, homopolymer (with the index of refraction in a 1.50–1.51 range at 1550 nm) and 0.3 grams of glycidyl methyacrylate (composition (III)) on the hot plate at a temperature of about 60° C. Upon dissolution, 26 mg of cationic initiator (triaryl sulfonium hexafluoroantimonate salts) and 21 mg radical initiator (Radocur 1173™) were added into the liquid formulation. The clear solution was coated to the ends of the optical fiber, such as Corning's SMF-28™ optical fiber. After curing under the UV lamp ($\lambda$=365 nm) for ten seconds (120 mJ/cm$^2$), the entire composition was post-baked at 150° C. for 15 minutes. Measuring the reflection light intensity of the fiber/polymer interface at a temperature between about 30° C. ad 200° C., we obtain the value of dn/dT and corresponding glass transition temperature of cured material (see FIG. 2A). The results from the plot showed a glass transition temperature of about 160° C. and the dn/dT about $-2.12 \times 10^{-4}$ between the temperature range of 30–140° C. The average refractive index of the core of the connecting waveguide at 20° C. is 1.493. These attributes make this photo-curable composition appropriate for low loss end fire waveguide coupling applications.

Process for Fiber-to-Fiber Coupling

We used the following procedure to write a waveguide between two single mode SMF-28™ fibers. First, the fibers were stripped of the coating and cleaved with a 90 degree flat cleave angle utilizing a standard fiber cleaver, such as Ericcson™ EFC II fiber cleaner or Siecor® FBC-006 high precision fiber cleaver, for example. Next, the cleaved fibers were placed in a precision XYZ stage to control the alignment of the fibers. A gap of approximately 75 microns was left between the two fiber ends. A drop of NOA 81 UV curable optical adhesive (available from Norland Products, Inc. of Cranbury, N.J.) was placed into the gap directly adjacent to the facing ends of the fibers and the fibers were actively aligned at 1550 nm to optimize the alignment of their cores (see FIG. 3A). The UV curable adhesive was flood cured from above (i.e., the entire region between the fibers was irradiated with UV using a UV spot curing source or lamp) with a low intensity (less than 10 mW/cm$^2$) UV lamp for 30 seconds to pre-gel (partially photo-polymerize) the adhesive. In this example, the intensity of UV light was about 3 mW/cm$^2$.

The flood-curing step raises the viscosity of the material and, therefore, increases the rigidity of the material. Without this step, the light coming out from the end of the fiber will locally cure the adhesive forming the core of the waveguide. This core would be situated in the un-reacted liquid adhesive and will eventually deform due to convection currents produced in the liquid matrix. After pre-curing (also referred as pre-gelling), high intensity UV light ($\lambda$=365 nm) from, for example, a Greenspot UV source (1200 mW/cm$^2$ at $\lambda$=300–400 nm) was launched, from the source towards the external ends of both fibers, simultaneously, for two minutes to write the waveguide between the two fibers. The resulting written waveguide region 16 is shown in FIG. 3B.

We demonstrated improved optical coupling between two SMF-28™ fibers using the UV end-firing curing technique. This technique was used to couple two SMF-28™ fiber ends that were clad aligned with a gap of 150 μm between them. Before the waveguide was written between the two fibers, the insertion loss (IL) was 4.68 dB. After the waveguide was written the insertion loss was 1.37 dB, an improvement of 3.4 dB.

Process For Writing Waveguide in a Gap of a Planar Waveguide Device

The following process was utilized to write a coupling waveguide in a gap between two arms of a planar waveguide 25 and to analyze the insertion loss before and after this coupling waveguide was made. It is noted that more than one coupling waveguide can be simultaneously made by this process.

Figure 4A:
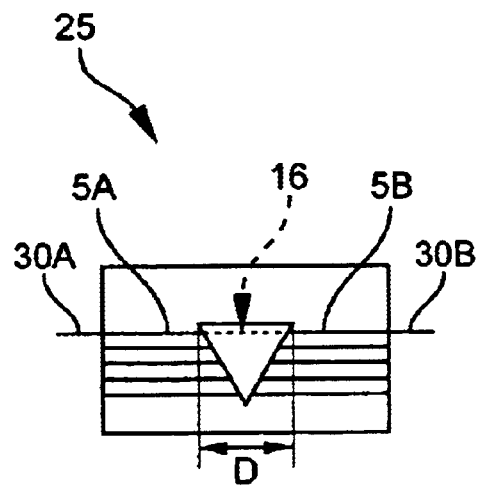
FIG. 4A is a schematic illustration of a planar waveguide.

A photo-polymerizable material is placed into the gap between opposing pairs of waveguides and the insertion loss is measured prior to forming the coupling (i.e., connecting) waveguides in this gap. The insertion loss is measured at 1550 nm by close coupling two fibers 30A, 30B to the ends of the straight waveguide 5A, 5B and measuring the power relative to a straight waveguide with no gap (see FIG. 4A). The cure process involved the following steps:

1) Pre-cure the material in the gap with a flooded low power UV source (180 nm<λ<450 nm; and power of 5–10 mw/cm$^2$) to increase the viscosity of the material. In this example the wavelength of UV source was about 365 nm and the power was 10 mW/cm$^2$. The actual pre-cure time will depend on the intensity of UV light source and the distance between the UV light source and the gap. The pre-cure time will usually be between 1 second and 1 hour, with a preferable time of about 4 seconds to about 0.5 hr.

2) Launch UV light (λ=365 nm) through the waveguides, by coupling the UV light through SMF-28™ fiber. This step will "end-fire" cure the material between the two opposing arms of the waveguides, thereby writing a connecting waveguiding core therebetween.

3) Thermally postcure to rigidize the entire matrix (cladding and core) of the coupling waveguides. The typical past cure temperatures are 0.5 hr. to about 3 hours at temperatures of about 70° C. to about 250° C. In these examples the post-cure times were 120° C. for about 15 minutes and 70° C. for one (1) hour.

Finally the insertion loss at λ=1550 nm was measured again in order to determine the waveguide efficiency in reducing loss from the free space propagation value. It was determined that the insertion loss decreased after the waveguide was written.

Figure 2B:
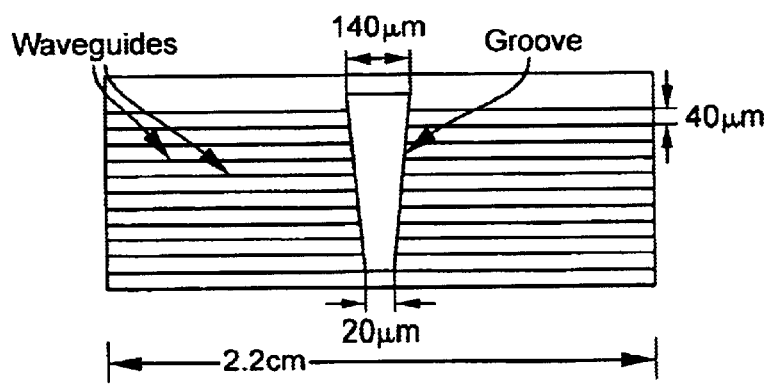
FIG. 2B is a schematic illustration of a planar waveguide array with a substrate containing a trapezoidal shaped gap.

Several experiments using the above described end-fire curing process in order to write waveguides in a polymer filled gap are presented here. These experiments succeeded in demonstrating nearly total elimination of insertion loss due to diffraction. More specifically, we utilized a planar waveguide array with straight waveguide pairs. This waveguide array had 60 pairs of straight waveguides. The length of this waveguide array was 2.2 cm and the spacing between the waveguides was 40 microns. The waveguide pairs were separated by an etched trapezoidal gap as shown in FIG. 2B. The gap at the wide and narrow ends measured 140 nm and 20 nm long, respectively. The difference in the gap length between each adjacent successive waveguides was 2 microns. Free space propagation through the gap causes a gap length (D) dependent loss (Loss) which for an index oil filled gap (n=1.45) is described by the following equation:

$$Loss_{oil}=(\text{Coupling Loss})+(\text{Propagation Loss})_{oil}+0.047 \text{ dB } (D-16 \text{ μm}).$$

If a coupling waveguide is written between the two separated waveguides W, then the total insertion loss is independent of the gap length D and is described by the following equation.

$$\text{LossWaveguide}=(\text{Coupling Loss})+(\text{Propagation Loss})_{waveguide}$$

When the experiment was run, the power transmission was measured by close coupling of two fibers to the ends of the waveguide 5A, 5B before and after the writing of the coupling waveguide there between. The improvement in power transmission was compared to the gap length dependent insertion loss to determine the efficiency of the waveguide. For the above described device the coupling loss plus propagation loss (i.e., material absorption loss) is about 0.8 dB +/−0.3 dB, based on uninterrupted straight waveguide (i.e., a 2.2 cm waveguide device with no gap) measurements.

Figure 4B:
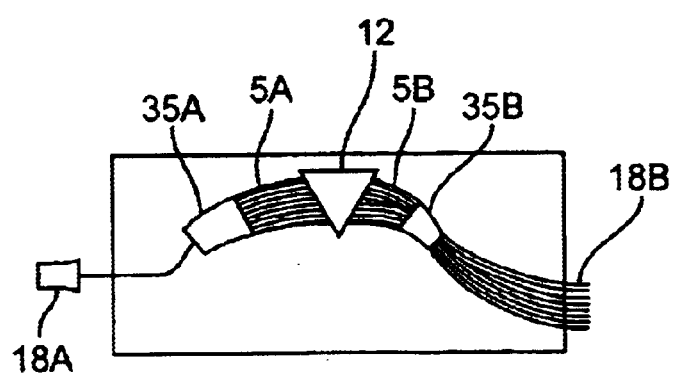
FIG. 4B is a schematic illustration of the WDM device.

End fire curing through a complete phase array was performed on a 1×8 phasar device incorporating two star 35A, 35B. The results successfully indicated that a single end-fire cure process could simultaneously write waveguides across each of the arms in a phase array. This device is illustrated in FIG. 4B.

Several examples of varying process conditions to write waveguides in the groove indicate the process parameters, and potential for this technique. The pre-cure (pre-gel) step was found to be important in achieving lowest possible loss.

Figure 5A:
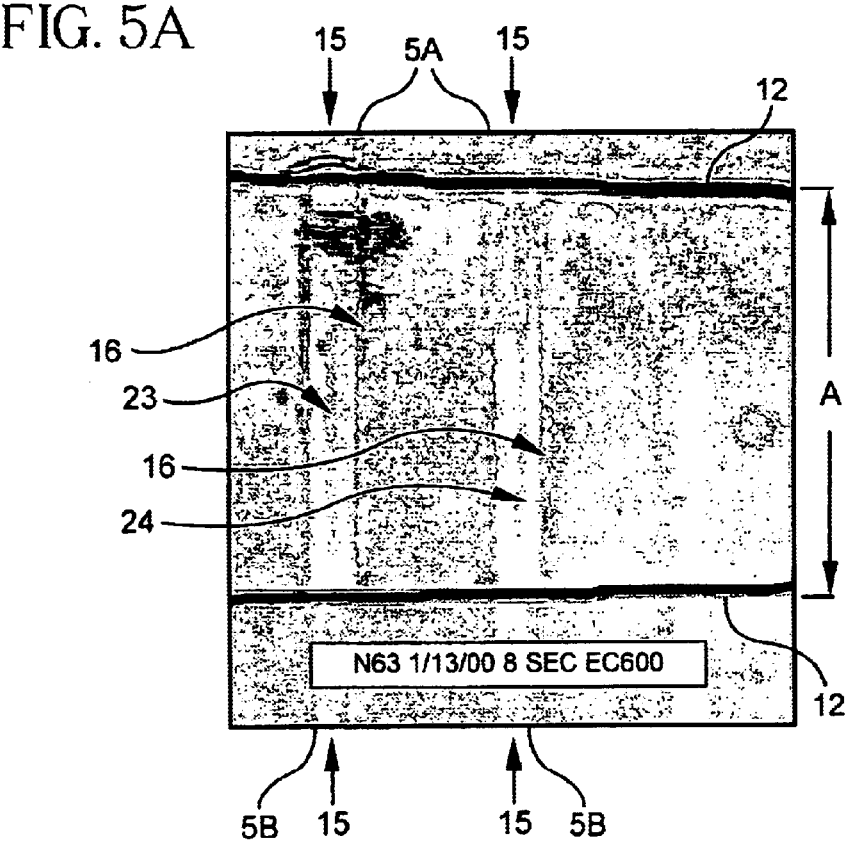
FIG. 5A is a micrograph showing a groove with "bow tie" shaped waveguides, due to excessive pre-cure.

FIG. 5A shows a sample made under good pre-cure conditions, using a fast curing photo polymerizable optical adhesive (NOA 63 available from Norland Products, Inc., of Cranbury, N.J.) in the gap. This adhesive was pre-cured for eight (8) seconds by illumination with 10 mw UV source from a distance of about 2 cm, and then end-fire cured for one hundred twenty (120) seconds at room temperature equal to 23° C. The formed waveguide was straight and confined. When this procedure was repeated without a pre-cure step (pre-cure time=0 seconds), no reduction in loss was measured and the waveguide shape was deformed.

Figure 5B:
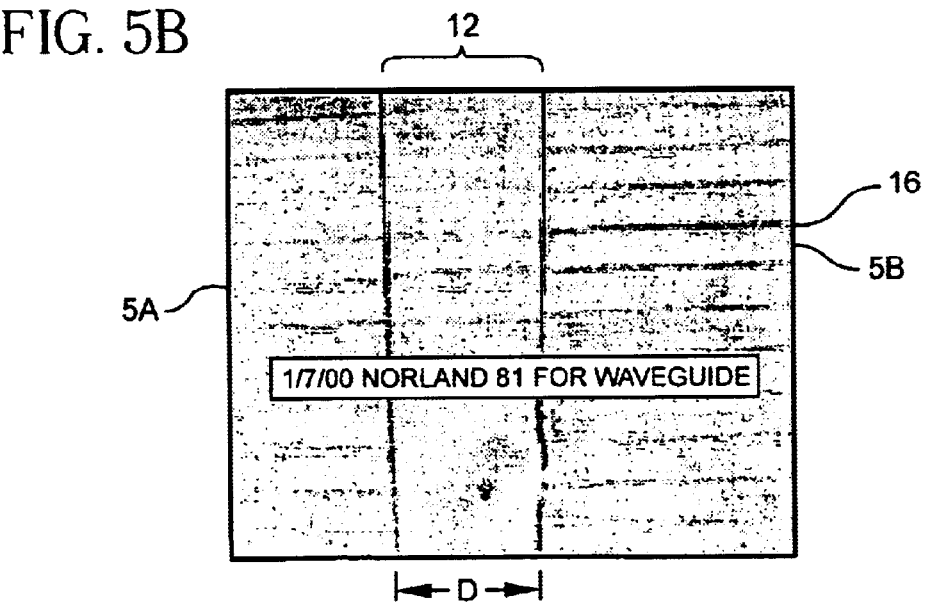
FIG. 5B is a micrograph showing loss reducing waveguide, in a gap filled with NOA 63 material.

FIG. 5B shows an example of a sample that was pre-cured for too long before end-fire curing. The gap was filled with another fast curing photo polymerizable optical adhesive, NOA 81 (also available from Norland Products, Inc.), and was pre-cured for 30 seconds and end-fire cured for 20 minutes. Here a "bowtie" pattern was formed in the polymer, the result of the UV beam divergence across the entire gap width from both waveguides. The loss improvement measured in this example was only 0.7 dB relative to a gap width dependent loss of 4.8 dB. The examples show how the above described process results in improvements of loss and how the pre-curing step results in better quality of waveguides formed by the end-fire curing process.

Figure 6A:
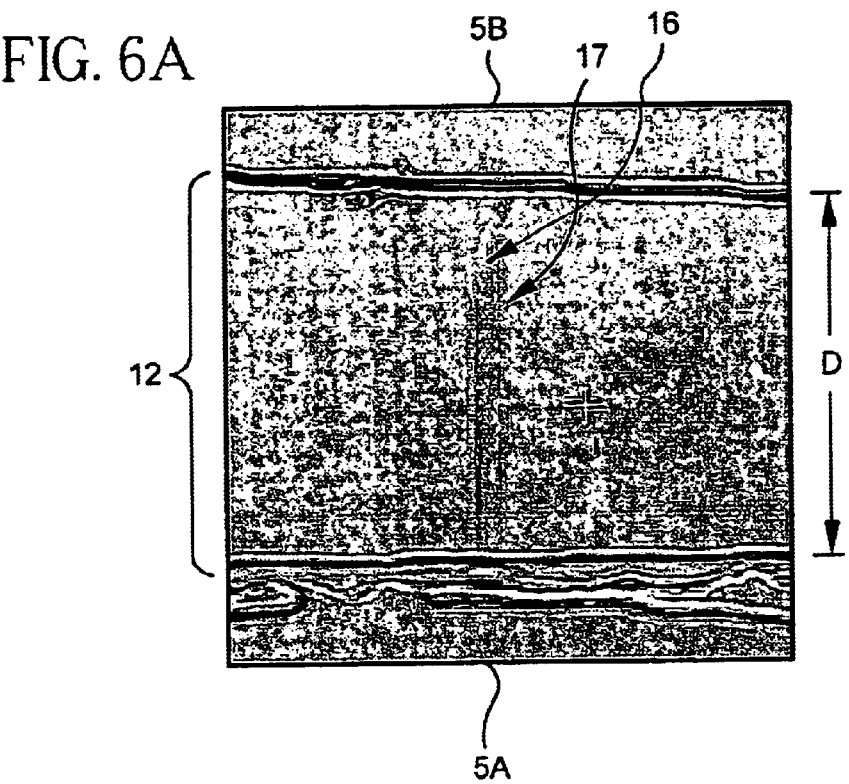
FIG. 6A is a micrograph showing the waveguide, in a gap written in a photo-polymerizable composition.

Fast, photo-currable multi-component optical adhesive F1, manufactured by Corning Inc., was then utilized to form low loss coupling waveguides that could provide excellent stability upon exposure to subsequent UV and heating. This adhesive was processed by coincident flood illumination and end-firing for 300 to 600 seconds. The waveguide device was then heated to 100° C. for 1 hour to thermally cured and rigidize the device. FIG. 6A shows a waveguide formed with the 300 second cure, through D=96 μm. The resultant index contrast of a written waveguide is about 1%. Then the propagating mode is well confined in the waveguide, contributing to the low insertion loss. The formed waveguide is stable as the index gradient is defined by a cone that is depleted in the low index material. Such a structure cannot be bleached optically or thermally. The loss improvement measured for this example was 3.6 dB. That is, the formation of coupling waveguide recovered nearly all of the original 3.7 dB diffraction loss.

TABLE 1

Data for the waveguide writing embodiments described above

|  | Example 1 | Example 2 | Example 3 | Example 4 |
|---|---|---|---|---|
| Polymer | UV3000 | NOA 81 | NOA 63 | F1 |
| Loss calculator from D | 4.8 | 5.1 | 3.7 | 3.7 |
| Loss Measured $_{oil}$ | 4.8 | 4.8 | 3.6 | 3.7 |
| Loss after endfire cure | >5 | 4.1 | 0.9 | 0.1 |
| Improvement | None | 0.7 | 2.7 | 3.6 |
| Process | End cure only, no pre-cure | Pre-cure End cure 20 min | Pre-cure 8 seconds End cure 60 seconds | 1) Simultaneously Co-cure top and fire end cure for 300 seconds |

Figure 6B:
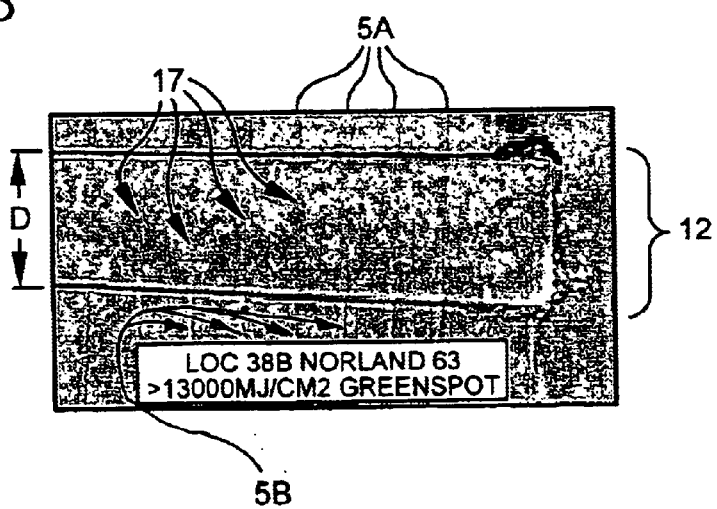
FIG. 6B is a micrograph showing waveguides in phase array, a gap filled with NOA 63 material.

Finally, coupling waveguides within a trapezoidaly-shaped gap were written in a phase array utilising the method described above. The major difference between the phase array compared to those previously described devices is that when the UV source is launched into the input and output waveguides, the light follows a path that first enters a slab waveguide with free space propagation before impinging on the phase array, a group of 50 to 100 waveguides that perform the grating function in the device. For a given incident power, the actual UV signal crossing any one path across the gap has about 1 to 5% of the original power. FIG. 6B shows an optical micrograph of the phase array region filled with NOA 63, and exposed for 1 hour using multimode fiber end-fire curing (maximize UV power coupling into the planar waveguides), with low intensity flood curing. The micrograph shows a region in the gap phase array where 10 waveguides were written with the single exposure.

The process described here was developed in response to needs arising from athermalization of phase array WDM devices and fiber to fiber splicing. The key elements are that a low cost process is used, and low optical loss can be achieved. In the case of the phasar devices this technology could be used to athermalize the output wavelength positions. In fiber to fiber splicing this technique can be used to couple light between fibers with significantly different material properties, where fusion splicing is difficult to impossible. Other applications can be easily envisioned as falling within the scope of the invention. Thermo-optic devices made by replacing a section of silica planar waveguides, for example in one arm of a Mach Zehnder device, with UV waveguidable polymer with large negative dn/dT could be used to maintain low loss and to reduce switching power by a factor of 25. Issues with multiple gaps in a single pass would have to be addressed. Also the potential of reducing coupling loss in fiber to fiber bonds where the two fibers have poor mode field match characteristics could have significant utility.

Accordingly, it will be apparent to those skilled in the art that various modifications and adaptations can be made to the present invention without departing from the spirit and scope of the invention. It is intended that the present invention covers the modifications and adaptations of this invention as defined by the appended claims and their equivalents.

What is claimed is:

1. A waveguide device comprising:

(i) at least one pair of optical fiber waveguides located such that (a) light radiation propagating through one of said waveguides will be at least partially coupled to a corresponding waveguide and, (b) said optical fiber waveguides are separated by a gap of about 2 μm to about 500 μm, said optical fiber waveguides having dn/dT that is larger than 0.0/C.°;

(ii) at least one, another non-planar waveguide connecting said at least one pair of optical fiber waveguides, said another non-planar waveguide having dn/dT of $-2 \times 10^{-4}/C.°$ to $-4 \times 10^{-4}/C.°$.

2. A waveguide device according to claim 1, wherein said waveguide device is includes (i) a plurality of optical fiber waveguide pairs separated from one another by a trapezoidal gap, wherein said trapezoidal gap includes a plurality of the non-planar waveguides connecting said pairs of optical fiber waveguides; said plurality of the non-planar waveguides having lengths that vary from one another.

3. A waveguide device according to claim 1, wherein said waveguide device provides a plurality of narrow band optical signals each corresponding to one of a plurality of output ports, including a center signal provided by one of said ports, said center signal characterized by a predetermined wavelength and, said device is athermalised so that Δλc<0.01/° C., where Δc is said predetermined wavelength.

4. A waveguide device according to claim 1, wherein said gap separation is between 5 μm and 200 μm.

5. The waveguide device according to claim 1, wherein said another, non-planar waveguide is thicker in the middle than at its ends.

* * * * *

UNITED STATES PATENT AND TRADEMARK OFFICE
CERTIFICATE OF CORRECTION

PATENT NO. : 6,744,951 B2
DATED : June 1, 2004
INVENTOR(S) : Steven B. Dawes et al.

It is certified that error appears in the above-identified patent and that said Letters Patent is hereby corrected as shown below:

Title page,
Item [73], Assignee, "Cornigg Incorporated" should be -- Corning Incorporated --

Signed and Sealed this

First Day of February, 2005

JON W. DUDAS
*Director of the United States Patent and Trademark Office*